United States Patent
Busch et al.

(10) Patent No.: US 6,390,921 B1
(45) Date of Patent: May 21, 2002

(54) COMPUTER BASED METHOD AND APPARATUS FOR ENABLING COLLABORATION OF MULTIPLE GAME PLAYERS

(75) Inventors: Steven Busch; Scott Bolson, both of Sunrise, FL (US); Nick P. Gallery, Masonville, IA (US)

(73) Assignee: Everglades Resources, Inc., Runrise, FL (US)

( * ) Notice: Subject to any disclaimer, the term of this patent is extended or adjusted under 35 U.S.C. 154(b) by 0 days.

(21) Appl. No.: 09/498,748

(22) Filed: Feb. 7, 2000

(51) Int. Cl.7 .................................................. A63F 9/24
(52) U.S. Cl. .......................................... 463/42; 463/17
(58) Field of Search ................................ 463/16, 17–19, 463/30, 31, 40, 41, 42, 26, 22; 705/14, 16, 18; 273/271, 138.1, 264, 236

(56) References Cited

U.S. PATENT DOCUMENTS

| | | | | |
|---|---|---|---|---|
| 4,815,741 A | * | 3/1989 | Small ...................... | 273/138 A |
| 5,569,082 A | * | 10/1996 | Kaye ........................... | 463/17 |
| 5,883,620 A | * | 3/1999 | Hobbs et al. ................ | 345/168 |
| 5,951,396 A | * | 9/1999 | Tawil .......................... | 463/19 |
| 6,024,641 A | * | 2/2000 | Sarno .......................... | 463/17 |
| 6,117,013 A | * | 9/2000 | Eiba ............................ | 463/41 |
| 6,168,521 B1 | * | 1/2001 | Luciano et al. .............. | 463/18 |
| 6,173,267 B1 | * | 1/2001 | Cairns ......................... | 705/14 |

\* cited by examiner

*Primary Examiner*—Joe H. Cheng
*Assistant Examiner*—Kim T. Nguyen
(74) *Attorney, Agent, or Firm*—Liniak, Berenato, Longacre & White

(57) ABSTRACT

A method and apparatus for effectuating the multilateral, sponsor driven winning of multiple "collect & win" games by individuals or businesses. The system allows individuals to share information pertaining specifically to so called "collect & win games" where a "piece" is needed in conjunction with other pieces, to win a prize from a game sponsor. The system receives and stores data on its members including their pieces, the game involved, as well as any requested information. The system matches one member's ("player's") "piece" with pieces of another player or players. The system then sorts the data and alerts our staff of possible winners with "matching" pieces. The apparatus includes a controller which receives information from registered users, sorts information according to specific criteria, matches criteria based on the rules of the game, notifies the system operator of any viable matches, and then notifies members of their status.

12 Claims, 1 Drawing Sheet

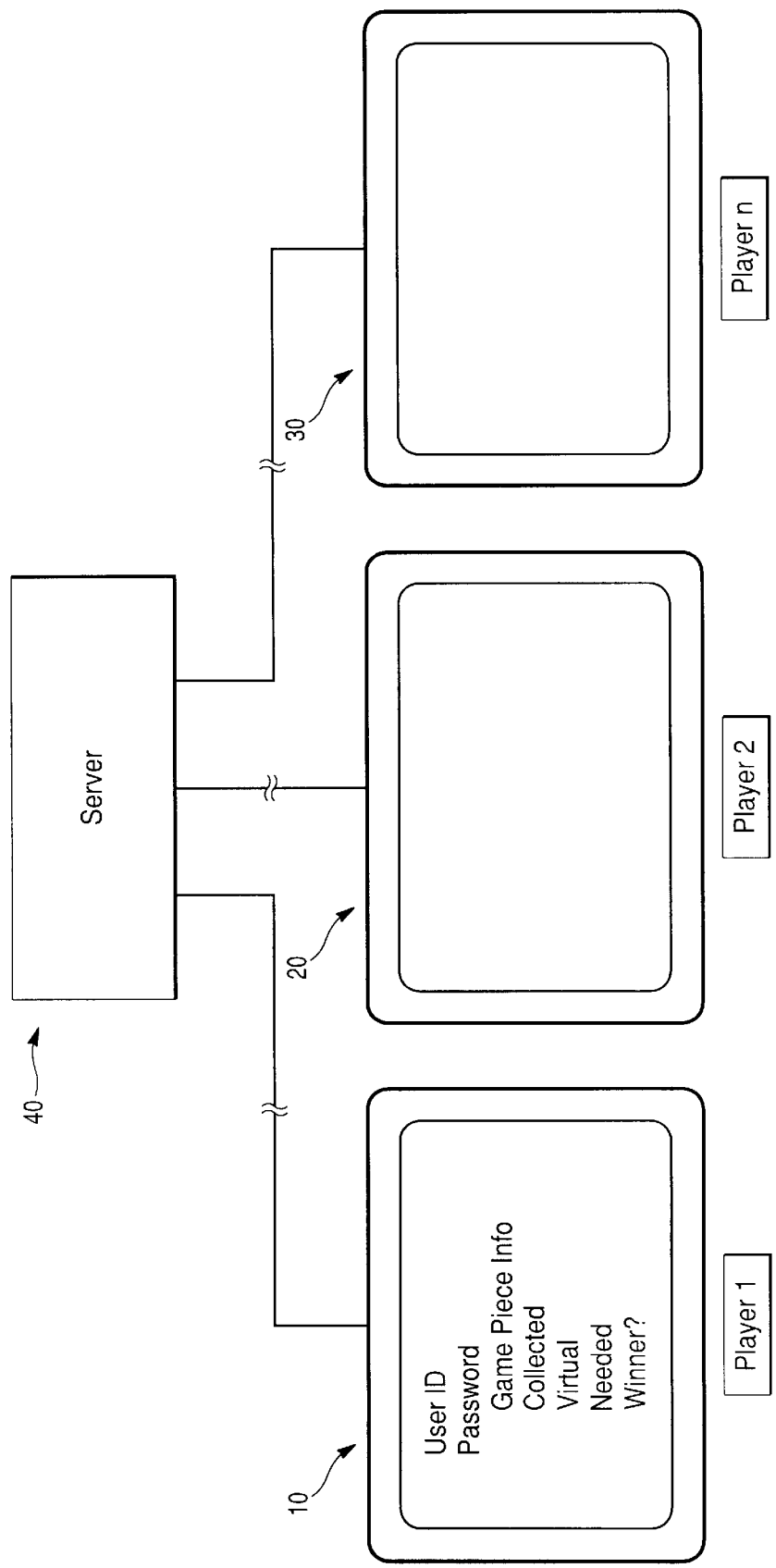

US 6,390,921 B1

COMPUTER BASED METHOD AND APPARATUS FOR ENABLING COLLABORATION OF MULTIPLE GAME PLAYERS

BACKGROUND OF THE INVENTION

1. Field of the Invention

The invention is related to multilateral, sponsor driven winning of multiple "collect & win" games by a disparate group of people or businesses. More particularly, the invention creates the ability for individuals to anonymously or openly share information pertaining specifically to "collect & win" games or sweepstakes promotions where a "piece" or code number (such as from a receipt) is needed in conjunction with other pieces or numbers, to win a prize from a game sponsor. A sponsor may be a promoter, advertiser, retailer, or a site provided by the invention.

2. Description of Related Art

Retailers and manufacturers such as COCA-COLA™ and McDonald's™ commonly sponsor promotional games. In such a promotional game a player must collect a combination of elements in order to win a prize or one of many prizes given by the sponsor. For example, a cola-beverage manufacturer may print letters inside the bottle cap, and a player needs to collect the series of bottle caps with the letters C-O-L-A to win a prize. The game is usually available nationally if not worldwide and the odds of winning certain prizes are related to product distribution and availability among many other factors. Therefore it is difficult to collect the series of winning game pieces, since for example all of the "A" bottle caps may be distributed in a certain part of the country, whereas all of the "C" caps may be in a different part of the country or there may be only one or two winning letters in the entire geographic region of the game. It is highly unlikely that a player in say California or Japan would ever meet or have occasion to meet a player in Mississippi and share "pieces" to win and/or share in contest prizes. The system according to the invention thus solves a problem and allows for an end product to be acquired, as will be described herein.

SUMMARY OF THE INVENTION

The apparent advantages and objects of the invention of the computer based method and apparatus according to the invention follow appropriately.

It is an object of the invention to provide a means for allowing players from all available playable geographic areas to combine different pieces so as to increase their chances of winning a prize.

It is another object of the invention to utilize computer modems, telephones, satellites and other devices which communicate with or on the Internet (i.e., the world wide web) and through such, to connect disparate players from all over the world and allow players to "share" and combine pieces with others in order to win prizes. The term Internet is used synonomously with the term "world wide web" (www).

It is another object of the invention to provide a system, which matches a player's piece(s) with other players' pieces in order to collect enough pieces to share in the given prize.

A specific object of the invention is to develop promotional games where the only place a player will be able to obtain a piece is via the system. This piece will be "virtual" in nature in that it exists only on the game system according to the invention and can be combined with other virtual or actual pieces from other players to win a prize.

It is a further object of the invention to instill a "fairness" system to see if a player is cheating or abusing the system.

An advantage of the invention is to offer increased odds to a player while helping sponsors to appear as if a game can actually be won and thereby increasing interest in the games and ultimately generating more sales.

A further advantage provided by the invention is that sponsors have a way of combining TV ads or programs, and product sales to generate interest in their products, due to the present invention.

The invention comprises a method and apparatus using a computer-based system for facilitating multiple players to increase their chances of winning a "collect & win" game collaboratively. The game requires multiple game pieces to be matched in a winning combination for the game to be won. More particularly the system and method receives and inputs data for at least one game player. The data includes identification of a player and of a player's game piece.

The system performs tracking and referencing of the data received for a player and for other players each having inputted unique data to the system. The data is matched from different players to match their multiple game pieces into a winning combination or portions of winning combinations in order for the game to be won collaboratively by multiple players.

The system notifies the multiple players via the system of a possible winning combination of those multiple players' game pieces. The validity of the multiple players' game pieces is verified by the system and/or the sponsors. Additional winning combinations are matched from alternate players having appropriate matching game pieces or appropriate portions of matching game piece combinations.

Matching game pieces are displayed by the system according to the players' data including winning combinations and portions of winning combinations of multiple game pieces. The display is accessible by the players via the system.

The time and date of data received for each unique data input is stored and used for referencing, thereby enabling multiple potential winning combinations or portions of winning combinations of game pieces to be matched, sorted, and ranked, according to the time and date. The system additionally notifies each player of a winning or losing status as determined by parameters of the game.

The system can receive and input data for multiple different games, each having unique game parameters and multiple game players. The system references said data by generating virtual game pieces with the unique data. Players suspected of cheating or unfair playing of the game are identified and flagged as potential cheaters. The above mentioned advantages and objects of the present invention will further become apparent when taken with the detailed description of the invention.

BRIEF DESCRIPTION OF THE DRAWINGS

FIG. 1 is a computer-based system that includes means for receiving and inputting data, means for tracking and referencing data and means for matching data.

DETAILED DESCRIPTION OF THE INVENTION

The invention is a computer system apparatus as shown in FIG. 1 and a method for using the computer system to facilitate a shared winning combination of elements between a player or players, and at least one other player, players, or group of players 10, 20 and 30. The players are participating in a particular "collect & win" game, usually of a promotional nature, in order to win a predetermined prize given by a sponsor of the game. The system receives and inputs data from a player into a computer database provided on a server 40, which has a game web site located on the Internet. The data includes a game "piece" involved and the system provided by the present invention tracks and references the data for further use. The system game site is exemplified herein as a web site on the Internet. However, it will be recognized that the game site may be accessed, available, and/ or furnished by a number of alternative methods provided by the state of the art, for instance Web-TV, satellite or wireless communication, Cable-TV, etc.

In order to input the game piece data into the computer database, a player using a Username and Password logs onto the game web site home page, clicks on an icon for the game the player wishes to play (for which the player has obtained a game piece). The player then answers or declines to answer a pop up window with questions pertaining to the game sponsor, if a pop up window is to be used for that game. The data is further input by the player by clicking on a game piece icon corresponding to the game piece the player has in possession, or by typing in the letter, the number or code on the game piece or receipt. The system verifies the choice the player has clicked on by requesting the player answer yes or no to proceed, and that the player input any verifying code data such as a serial number on the piece being entered. The game web site allows a player to click on "finished" if the player is finished with the game or to click on "choose another piece" if the player has more than one piece to play. The process may be repeated if the player has more pieces to play. The player may further answer more questions from a pop up window about the sponsor of the game if desired. When the finished player clicks on "finished" the game web site returns the player back to the home page, where the player may then play or check out any other game as desired and proceed as above.

The system stores the time and date of entry by each player and keeps track of which player played first, second, third and so on by the entry information. The system utilizes a software package to match co-winners by analyzing, sorting and matching the information entered per a set protocols, and upon matching potential winners, the system notifies the system operator of potential winners' status for farther processing. The system does this by storing the time and date of entry by each player and allows more than one player to click on the same game piece icon thus registering that they are in possession of a particular piece. Therefore system keeps track of which player played first, second, third and so on by above.

In particular a player becomes involved with a game by obtaining a "collect & win" game piece or coded receipt at a retailer or by other means including participating Internet sites. The receipt can contain a code, which is used only in conjunction with the system's Internet site. The player enters the code at the appropriate location on the system site by logging onto the system with a unique username ID and password. Then the system determines if the code is acceptable via a list of codes generated by the promotional retailer or the site itself (if the site is the sponsor of the game or is designated to do so on behalf of the sponsor) which is matched against the players' entry. If the system determines that the code is acceptable, then the system enters the player's ID and generates a virtual game piece for the player marking the time and date of entry for further use. The system according to the present invention then stores the data for the player and the player's piece or pieces for matching purposes with other players and their pieces.

The system then matches a player's piece(s) with other players' pieces in order to collect enough pieces to share in the given prize. This aspect of the invention will become more clear by way of game examples provided herein. The system repeats the above steps by way of matching, tracking and contacting winners and losers. Each game piece will have a code sequence, character, piece, etc. associated therewith, which will be playable at the system's site described herein. Again, once the player has matched a game piece(s) with other players' pieces, then all parties thereto are notified via email, telephone or regular mail of their status.

The system further allows for all of the above by way of allowing retailers to develop games with game pieces (other than or in conjunction with receipts) given away to customers that will only be playable on the system. The system allows for the development of promotional games where the only place a player will be able to obtain a piece is via the system. This piece will be "virtual" in nature in that it exists only on the game system according to the invention.

The system provides for a notification via email that a player(s) has won or is part of a winning combination with other players if such is the case, as determined by the computer system. A disclaimer is included with the email that no player shall be determined a final winner until verified by the company and accepted by the sponsor. The winners must then supply the actual game pieces via the mail or private courier (unless they are virtual pieces generated by the system) that have been determined by the system to be winners when matched with other players' pieces. The game pieces must be delivered in good and verifiable condition to the company for further processing. The company then sorts, processes, verifies and gets the sponsor's acceptance of a winning status for the pieces thus received.

The system will also notify via email at least five other subsets of winners (for example) if they may have winning pieces when said players are matched with others in the event the first winners fail to produce said winning pieces. It will be appreciated that the notification may be achieved by numerous alternative methods, such as Web-TV, satellite or wireless communication, telephone, regular mail delivery, etc.

In most promotional games an expiration date exists whereafter the game is no longer playable as determined by the sponsor. Therefore, if no matches are found by the expiration date, then the system notifies each playing member that they were not a winner. Additionally the game icon is removed from the game site once the game has expired with a message stating such, in order to inform all of the game participants further. The data that was obtained for the players of an expired game is stored by the system for future informational purposes.

The present invention provides the unique ability to add longevity to a game or promotion through the use of virtual game pieces. Specifically, the invention enables a site to host games for a longer duration without continued marketing and physical manufacture of games pieces or sales receipts after the physical expiration of the game. Thereafter, the game continues on the Internet site only, and the sponsor is no longer responsible for the manufacture of bottle tops, proof of purchase receipts, or other game pieces.

It is possible that the system can make available to the player of a game via the game site all of the major languages of the world so that people may play no matter which language they speak and read. This feature may be accomplished with translation software or by other means, which may be posted on the game site, i.e. showing icons, drop-down boxes, etc., of optional languages available to play the game in.

The system utilizes a "fairness" system to see if a player is cheating or abusing the system. A player is allowed only one username ID to play a particular game piece which is identified by a unique code or serial number, so that a player may only play a certain piece once. A player will be told that they are already registered as a holder of a piece and will not allow entry for time and date purposes of a "played" piece that was previously entered, whether by the same player's username or by another. There are at least 1000 time and date slots thus allowing for "back-up" players to be considered for prize winning in case player 1 fails to produce a game piece, as required by the game rules. Of course, the specific game parameters will be dependent on the nature of the game and promotion. If a player has collected all of the game winning pieces, presumably the player would not need the game site to match with others, and therefore one player is not allowed to play more than ⅔ of any one game board. This prevents a player from trying to get preferred time and date status while waiting to collect additional pieces.

The fairness system is provided with a means for flagging players suspected of playing unfairly in the following manner. If a player clicks on all of the pieces of a specific game board in one sign-on session or within three consecutive days (or any other reasonable time range determined by the system operator), the player is notified that they are presumed to be cheating for time and date placement. Such a designation as above will result in the system voiding said player's entire board as to time and date and the player must then re-enter only valid pieces within their possession. The above will result in the suspect player being placed in queue behind players who did not attempt to cheat or play unfairly.

If a player who is determined by the system to be cheating attempts to cheat again, the player is notified that his or her game-account will be closed and all other games the player has participated in will be voided as well. The player must then sign up again as a new member if the player wants to play any future games. If the player uses the same email location as when he or she first became a member, then that email address will be used to put the player on a cheaters watch list.

In any of these methods, if a player becomes flagged by the system as a former cheater and the player is determined to have cheated again, they will once again be voided on all games and be canceled as a member. When this occurs, then the system will have the player's email address flagged as a persistent cheater. That player will no longer be able to become a member while using the flagged email address. The player may become a new member registered with a new email address and the process would then repeat.

Another feature of the system is that players can interact via a chat room set up as is commonly used on the Internet, or by other means. Members may post messages or chat in real time for each game or in a general chat room.

Furthermore, an individual player can view or access their current status as to which pieces he or she has already played, how many pieces are left to play before a win, which pieces the player is missing, and where the player stands in terms of winning by matching pieces with other players.

The invention features a game-board for viewing pieces on a board in conjunction with other players. This is performed by the system using time, date, and identity data as described above. For instance, the first players to play the pieces x, y, and z will share a board. The first player to complete the board with the letter q assuming that the winning combination for the game is x-y-z-q will allow all the players to share in the given prize. Players can therefore view a board showing where they are located based on a first come first played basis (there could therefore be unlimited numbers of boards), or players can play on a specific board they choose if space is available.

The numerous features and functions performed and achieved by the system according to the invention are enabled by appropriate software applications, computer hardware configuration, system network and server existence and connections, web sites, internet access, etc., as will be understood by those skilled in the art.

The present invention will be further understood by way of the following exemplary games which can utilize the invention to benefit all participants, be they player, sponsors, retailers of sponsor's products, etc. These examples are in no way meant to limit the scope of the invention and are intended to be only exemplary in nature.

EXAMPLE 1

On Jul. 16, 1999 (or there about), McDonald's™ and several other "branded" entities, began play of what was called The McDonald's QPC Code Name Game™. The other entities included DISNEY, CHEVROLET, AMERICAN AIRLINES, JVC, IBM, ACE HARDWARE, FTD, FIRST UNION, STAR, HONOR (ATM), the NBA, BMX, and the GO NETWORK (all Trademarks) to name most, if not all of the "game" sponsors. Consumers, who received, after purchase or mail in request, so called game stamps (pieces) that were used to identify instant prizes or code pieces played the game. The Code Name Game was available for play in McDonald's™ restaurants in the U.S., Guam, Saipan, Puerto Rico, Bahamas, Aruba, St. Marten, and Curacao "while supplies last" at a given store. So if a store runs out of game pieces, then people in that area may never have a chance to win or share more pieces with others nearby. The system of the present invention eliminates this problem, among others. Obviously, the winning pieces are most likely distributed in places where individuals will have little, if any, chance to share pieces with other winning pieces, (or at least that is the perception of the mass populace of players.)

By way of example, the Code Name Game has pieces representing prizes of $1,000,000, His and her CHEVY CAMARO Z28's™, a CHEVY TAHOE™ and a $1,000 ACE HARDWARE™ tool package. The pieces required are, respectively: Q, P, C (stamp #'s 10,11,12); Z, 2, 8 (stamp #'s 13,14,15); S, U, V (stamp #'s 16,17,18); and A, C, E (stamp #'s 28, 29, 30) where all three game pieces, in this case the three letters corresponding to a particular prize, must be collected and verified as valid game pieces in order to win the particular prize. According to the game's fine print, the number of prizes possible and their odds of winning said prizes are as follows:

| Prize: | Total # of game prizes | Odds with 1 game piece | Odds with 4 game pieces | Odds with 8 game pieces |
| --- | --- | --- | --- | --- |
| $1 million | 3 | 1 in 174,766,667 | 1 in 43,691,667 | 1 in 21,845,834 |
| His & Her Z28 | 3 | 1 in 174,766,667 | 1 in 43,691,667 | 1 in 21,845,834 |

-continued

| Prize: | Total # of game prizes | Odds with 1 game piece | Odds with 4 game pieces | Odds with 8 game pieces |
|---|---|---|---|---|
| Chevy Tahoe | 3 | 1 in 174,766,667 | 1 in 43,691,667 | 1 in 21,845,834 |
| Ace package | 500 | 1 in 1,048,600 | 1 in 262,150 | 1 in 131,075 |

(Note that there are many more prizes with differing values and odds).

Therefore, a player with stamp #10 (Q), also needs to get stamp #'s 11 & 12 (P & C), to spell out the code QPC. If a player acquires all of the code pieces, the player would then follow the rules regarding claiming the prize, and win said prize. The hard part of course is getting the matching pieces. The player could, as does now happen, share said pieces with neighbors, relatives and friends that participate in the game and are interested in sharing. The odds of these "similar" players winning, (meaning being located in a limited area of game participation) however, are unlikely due to the odds listed above. Especially when taking into account the time horizon of the game or the limited number of pieces available in a specific area.

The present invention, by way of connecting disparate players from all over the world via computer modems, telephones, satellites and other devices which communicate with or on the Internet and through such, allows players to "share" and combine pieces with others in order to win said prizes. Therefore, our invention would allow a player with a "piece" in Saipan, to combine said piece with a player in California, a player in Aruba, a player in Vermont, and so on. Prior to our invention, there was no feasible way to share pieces to win prizes by people who had no way of "knowing" each other because of the logistical problems in sharing information among other obvious reasons. Our invention seeks to increase a player's odds while helping sponsors to appear as if the game can actually be won and thus increase interest in the games, thus generating more sales.

For example, Don in CA goes to his local McDonald's™ and by means of a purchase, receives game stamp #10. Meanwhile, Sally in Vermont similarly obtains stamps #25 and #11. Roger in Aruba obtains stamp #12 at a McDonald's™ he visited in Saipan. Sally and Roger are both aware of a Game web site provided by the present invention, by way of co-branding or advertisement with the sponsor or other means. Sally and Roger connect to the Game web site of the present invention, and enter their game stamps on our site, respectively. Don meanwhile has read the odds and throws his piece out because he thinks he will never win. Unfortunately for Don, and all other players of the game, stamp #10 was one of the only three stamps #10's available for winning $1 million. Sally and Roger have not been back to McDonald's™ again but kept their pieces. Luckily for Sally and Roger, Ellen has already played game stamp #10 at our site and still retains her piece.

The Game web site system determines that Ellen was the first player to input game stamp #10, Roger was the first player to enter stamp #12, and Joanne in Wisconsin (yet another player) was the first player to enter stamp #11 at the game web site, prior to Sally's entry. The system notifies each player via email that they may hold winning pieces and instructs the players to forward the pieces to the game web site headquarters. The pieces are then reviewed by appropriate game web site staff and the game sponsor(s) to determine validity of the pieces. If the stamps are determined to be valid, the prize will be awarded to Ellen, Roger, and Joanne, since collectively they have possession of the three code pieces Q, P, C to win the $1 million prize. In this case, the system will notify the winners via email and follow up phone calls to discuss how best to divide the prize. The game web site staff can act as the middleman and go between for the three players as they do not know and may not want to know each other.

At the same time, the system has determined that there are three other players who are winners of the same prize and they are notified and processed in a similar manner. This goes on until all play has expired and all possible combinations of winners have been located. In the event that a notified potential winner has misplaced or discarded a winning piece, the system would notify potential back up winners according to their time and date of entry, for example Sally, whose entry was second to Joanne's in the above example. The system continues to notify potential winners until data is input into the game control system indicating that the winning pieces have been received in the mail at the game site headquarters. The names of the players who have won and who have delivered the winning pieces in good form are then entered into the system as prize winners. This information can be displayed appropriately on the game web site to inform other players of the current game and prize status.

EXAMPLE 2

Another example of our invention is the use of the game web site in conjunction with a TV, Radio or Web show or advertisement. For example, say John is watching MTV™ and a game is being sponsored which allows a viewer to win prizes if all of the correct pieces are obtained, similar to the prior example. In order to collect a piece, the player must be watching the program (or Ad) in order to be given a CODE, which is revealed during the program. The code can be a number, a letter, a combination or series of either, or a word. Once John has obtained the code, he would then sign on to the game web site, click on an icon of the game he is playing (in this example "MTV Rocks") and enters the code he obtained from the program. The code may only be valid for a short period of time (say one hour from airtime) or until the sponsor so determines.

Once John has entered the code, the game system randomly generates a "virtual" game piece that will be credited to his User ID and "played" on his behalf. Because of the nature of this game, millions of people may enter the same code in the time given, and many will try to enter it after the allotted time has expired. The game system sorts entries by time and date, User ID, and will not generate pieces (virtual pieces) for players after the given allotted time has expired. Players attempting to enter a code after time has expired receive a similar to "Invalid Entry. This code expired at X time EST."

In the MTV Rocks example, players must spell the names of a featured artist (band) or M-T-V, etc. The game expires by a date specified by the sponsor if so desired, or continues indefinitely until someone wins by means of the game web site system. (This feature of the present system, which allows for indefinite play, is not practical on current non-virtual forms of these types of games including example 1 above, mostly due to sponsors continually changing labels, ad campaigns, etc. Thus the invention adds a new dimension to promotional game markets of lengthy or no expiration until there is a winner(s) through the use of virtual game pieces.)

After John enters the code, he receives for example virtual game piece "M" (much like the Code Name Game, there will be different odds and chances of winning depending on the sponsor's rules etc.) and the system so credits "M" to his account or game board. Marcy is also playing and received game piece "T" after entering the same code, due to the random generation of the virtual game pieces by the game system depending on the odds provided by the sponsor. One month later, Mark in Australia viewed a code during an MTV program there. Mark enters the code on our system which generates "V" for example. The system immediately notifies the controller that "M T V" has been "received." The system then generates a list of the winners, emails them to notify them of their combined winning pieces. The winners are contacted for further distribution of the prize. In this case, "M T V" was the winning combination of pieces for 1000 CDs of choices available from the sponsor or $250,000. The game site staff acts as the middleman and divides the prizes between the winners, or has the sponsor send out equal checks or CDs to the winners per their requests.

Although game pieces may be generated for this game by way of TV, radio etc., game pieces may also be obtained by the "normal" route of obtaining product in a retail outlet. Thus, a CD purchase may result in a code # which will then be entered into our system (the code # will only be used once so as to track and gather information for the sponsor), generating a virtual piece for the buyer, and information for the sponsor. (i.e. The sponsor will know where the code was shipped etc.) In other words, sponsors have a way of combining TV ads or programs, and product sales to generate interest in their products, due to the present invention. Alternatively, a sponsor can run the promotions separately. The numbers of games, which can be generated using the present invention, are unlimited in both nature and scope.

Games can be geared for large retailers or small "mom and pop" stores or restaurants by using codes generated on receipts or actual game pieces. Without the present invention, it would be next to impossible to generate sincere interest by so many different people and so much recurring "advertising" by the sponsors (e.g. the act of going on-line and playing the game is an extremely targeted ad). All games and promotions have a unique feature by utilizing the invention to allow players to share pieces from anywhere in the world, without ever having to know each other.

For each game, the system also develops targeted questionnaires so as to determine where a player picked up a game piece, how many times the player visited a sponsor's location, where the player saw a code (i.e. TV channel), during what TV show a code was viewed, general demographic information, and any other information a specific sponsor may wish the system to ask the player. The player can choose not to answer the information if said so chooses unless the sponsor requires various information to be completed in order to enter the game piece. The present invention further includes a system of advertising by means of an Electronic Billboard where the E-Board advertisement may have a live or delayed feed of a specific web site by means of wire line or wireless communications. Game piece codes can be obtained and easily changed by this means to track how often or how useful a particular billboard is viewed by the consumer.

The present invention introduces yet another entirely new advertising and "collect and win" promotional system; on-line games. Games like chess, backgammon, Doom etc., where a player plays against an opponent(s) and seeks to win points (the highest score) or the game (checkmate) on-line. In this embodiment of the system, a player playing chess on-line will, depending on the sponsor's rules, obtain a virtual piece or code (to generate a random piece) upon taking another opponents piece (pawn, rook, queen, etc.) or upon winning the game. In the case of Doom, or other arcade type games, the player will generate a code or virtual piece upon scoring a certain number of points, making it to a new level, and/or upon defeating various or all obstacles in their path depending upon the rules of the sponsor.

These virtual pieces can then be used in the following ways. First they may be used in conjunction with other pieces obtained as in the McDonald's example (actual pieces or code driven pieces). Or they may be used for their own games such as DOOM RULES where the player can obtain pieces only at the game site for use on a designated site (or the sponsor's site if so arranged).

In each case, the piece is acquired as defined by sponsor rules. For example, in the McDonald's QPC Code Name Game, a player may obtain pieces at his/her local McDonald's or through a receipt or other virtual code as previously described. However, the player may also get virtual codes or pieces by playing chess against other players at the Gamesville.com (or similar site with games) web site. By way of example, the player gets the letter Q for taking a rook, the letter P for taking 3 pawns, the letter C for taking an opponent's Queen, the letter Z for getting their queen back, the letter V for winning the game, etc. Of course there are an unlimited number of ways to obtain pieces in this manner with the limitations to be decided by each individual sponsor.

In the DOOM example, a player may get pieces only by playing at a particular site or sites determined by the sponsor. For example, a player gets a virtual piece or code (to get a virtual piece) by killing 10 enemies or by scoring 100,000 points etc. Again there are too numerous combinations to go into here. These types of virtual games could be run separately from other "collect and win" games so as to drive traffic to a specific site or sites on the web.

Again, the object in all of these games is to collect game pieces and win a prize associated therewith. Some times a player may elect to play a virtual piece on his/her board only, whereas the player may also elect to share virtual pieces with others to increase his/her odds. Depending on the sponsor's rules in this case, there may exist "a piece played must stay where played" rule or a piece is freely movable to other boards rule.

Having thus described various exemplary embodiments of the invention, it will be understood by those skilled in the art that modifications or changes in details of the invention may be implemented without departing from the spirit and scope of the invention as defined in the following claims.

What is claimed is:

1. A computer-based system for facilitating multiple players to increase chances of winning at least one of a collect-and-win game and match-and-win game collaboratively wherein the game requires multiple game pieces to be matched in a winning combination for the game to be won, said system comprising: a. means for receiving and inputting data for at least one game player, said data including identification of the player and of said player's game piece information; b. means for tracking and referencing said data received for each of said at least one player and for other players each having inputted unique data to the system; and c. means for matching said data from said players to match said multiple game pieces into said winning combination or portions of said winning combination for the game to be won collaboratively by multiple players, wherein said winning combination is predetermined before the onset of the game.

2. The system according to claim 1, further comprising means for notifying said multiple players via said system of a possible winning combination of said multiple players' game pieces.

3. The system according to claim 2, further comprising means for verifying validity of said multiple players' game pieces.

4. The system according to claim 1, wherein said means for matching data further matches winning combinations from alternate players having at least a portion of said winning combination in conjunction with said means for receiving and inputting data.

5. The system according to claim 1, further comprising means for displaying matching game pieces according to said players' data including said winning combinations and portions of said winning combinations of said multiple game pieces, wherein a display provided by said means for displaying is accessible by said at least one game player via the system.

6. The system according to claim 1, wherein said means tracking and referencing said data of data received for each unique data input, enabling multiple potential winning combinations or portions of winning combinations of game pieces to be matched, sorted, and ranked, according to said time and date.

7. The system according to claim 2, further comprising means for notifying each player of a winning or losing status as determined by parameters of the game.

8. The system according to claim 1, further comprising means for receiving and inputting data for multiple different games, each having unique game parameters and multiple game players.

9. The system according to claim 1, wherein said game pieces are a combination of at least one of real game pieces which are tangible and uniquely coded for identification and validation and virtual game pieces generated by said system according to said unique data.

10. The system according to claim 1, wherein said system further comprises means for identifying and flagging game players suspected of cheating or unfair playing of the game.

11. The system according to claim 1, wherein said game piece is one of a physical game piece and a virtual game piece.

12. The system according to claim 1, wherein said means for tracking and referencing said data includes sharing of said at least one collected game piece between said players.

* * * * *

UNITED STATES PATENT AND TRADEMARK OFFICE
Certificate

Patent No. 6,390,921 B1                                                                  Patented: May 21, 2002

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Steven Busch, Sunrise, FL (US); and Scott Bolton, Sunrise, FL (US).

Signed and Sealed this Fifteenth Day of May 2012.

THOMAS G. BLACK
                                                      *Supervisory Patent Examiner*
                                                                      Art Unit 3661
                                                          Technology Center 3600